(12) United States Patent
Mathias

(10) Patent No.: US 8,951,335 B2
(45) Date of Patent: Feb. 10, 2015

(54) SELECTIVE CAUSTIC SCRUBBING USING A DRIVER GAS

(75) Inventor: Paul M. Mathias, Aliso Viejo, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 539 days.

(21) Appl. No.: 13/313,814

(22) Filed: Dec. 7, 2011

(65) Prior Publication Data

US 2013/0149224 A1    Jun. 13, 2013

(51) Int. Cl.
*B01D 53/40* (2006.01)
*B01D 53/52* (2006.01)
*B01D 53/14* (2006.01)

(52) U.S. Cl.
CPC ............ *B01D 53/1468* (2013.01); *B01D 53/14* (2013.01)
USPC ................... 95/235; 95/236; 96/243; 96/372; 423/220

(58) Field of Classification Search
CPC ............... B01D 53/1468; B01D 53/14; B01D 53/1456; B01D 53/1493; Y02C 10/06; C01B 2210/0025
See application file for complete search history.

(56) References Cited

U.S. PATENT DOCUMENTS

| | | | | |
|---|---|---|---|---|
| 4,545,965 A * | 10/1985 | Gazzi et al. | ..... | 423/229 |
| 4,824,645 A * | 4/1989 | Jones et al. | ..... | 423/226 |
| 5,102,635 A * | 4/1992 | Delaney et al. | ..... | 423/220 |
| 7,459,012 B2 * | 12/2008 | Davis et al. | ..... | 95/235 |
| 2002/0021994 A1 * | 2/2002 | Blue et al. | ..... | 423/224 |
| 2005/0132883 A1 * | 6/2005 | Su et al. | ..... | 95/235 |
| 2008/0038184 A1 * | 2/2008 | Hazewinkel et al. | ..... | 423/512.1 |

OTHER PUBLICATIONS

Weiland, R.N. et al., "Simulator Provides Guidance for Increasing CO2 Slip in Gas Treating Applications" Gas Processing, GasTIPS, Winter 2002, pp. 21-28.

\* cited by examiner

*Primary Examiner* — Duane Smith
*Assistant Examiner* — Cabrena Holecek
(74) *Attorney, Agent, or Firm* — Fish & Tsang, LLP

(57) ABSTRACT

Systems and methods are described for selectively removing an acid gas from a feed stream to reduce co-absorption of $CO_2$. The system can include an absorber configured to contact at least a portion of the feed stream with a caustic solution or other basic solvents to produce a clean stream substantially depleted of the acid gas. To reduce co-absorption of $CO_2$ by the caustic solution to less than 10% of the $CO_2$ present in the feed stream, the absorber can be further configured to receive a driver gas that is substantially non-reactive with the caustic solution.

18 Claims, 3 Drawing Sheets

SELECTIVE CAUSTIC SCRUBBING USING A DRIVER GAS

FIELD OF THE INVENTION

The field of the invention is caustic scrubbers.

BACKGROUND

Caustic solutions provide an effective means to remove $H_2S$ from acid-gas streams, but co-absorption of $CO_2$ is often a problem because $CO_2$ absorbs more strongly than $H_2S$. Absorption of $CO_2$ wastes the caustic solution and also may cause fouling due to the precipitation of carbonate solids (e.g., sodium carbonate decahydrate).

One solution has been to use a co-current contactor with very low residence times to minimize co-absorption of $CO_2$. Since $H_2S$ can be absorbed much more quickly than $CO_2$ at high pH levels, selective $H_2S$ removal is accomplished by limiting the contact time between the gas and the liquid in a static mixer. See, e.g., U.S. Pat. No. 4,824,645 to Jones, et al.

Maximizing the absorption of $H_2S$ and minimizing the absorption of $CO_2$ is typically controlled by varying the rate addition of fresh caustic, solution circulating rate and column characteristics such as packing height or number of trays. See, e.g., GasTIPS, "Simulator Provides Guidance for Increasing CO2 Slip in Gas Treating Applications", Weiland, Ralph H., et al., volume 8, no. 1, Winter 2002: 21-28. However, the low residence times used can limit the efficiency of the scrubber.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Thus, there is still a need for improved caustic scrubbers that reduce co-absorption of $CO_2$ by the caustic solution without requiring low residence times.

SUMMARY OF THE INVENTION

The inventive subject matter provides apparatus, systems and methods in which one can reduce co-absorption of $CO_2$ from a feed stream through the addition of a driver gas. Preferred systems are configured to selectively remove an acid gas from the feed stream. Using an absorber configured to contact at least a portion of the feed stream with a strong, basic absorbent to produce a clean stream substantially depleted of the acid gas.

The absorber can be further configured to receive a driver gas that is substantially non-reactive with the absorbent, such that co-absorption of $CO_2$ by the absorbent is reduced to less than 10% of the $CO_2$ present in the feed stream. As used herein, the term "substantially non-reactive" means that the driver gas will not react with the caustic solution to any appreciable extent. One preferred absorbent is a caustic solution, although any commercially suitable solvent could be used that is basic (e.g., an alkaline solution) and absorbs $CO_2$ more strongly than the acid gas.

In another aspect, methods of reducing co-absorption of $CO_2$ from the feed gas can include the step of contacting at least a portion of the feed gas with a strong, basic absorbent in an absorber to produce a clean stream substantially depleted of an acid gas. In preferred embodiments, the feed stream can include a driver gas that is (a) substantially non-reactive with the absorbent, and (b) sufficient to reduce co-absorption of $CO_2$ by the absorbent to less than 10% of the $CO_2$ present in the feed gas.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Various objects, features, aspects and advantages of the inventive subject matter will become more apparent from the following detailed description of preferred embodiments, along with the accompanying drawing figures in which like numerals represent like components.

DETAILED DESCRIPTION

One should appreciate that the disclosed techniques provide many advantageous technical effects including the reduction of co-absorption of $CO_2$ from a feed gas by utilizing a driver gas. Specifically, a simple wash process using a caustic solution or other basic absorbent can be used to minimize the co-absorption of $CO_2$ in $H_2S$ removal from acid gas.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
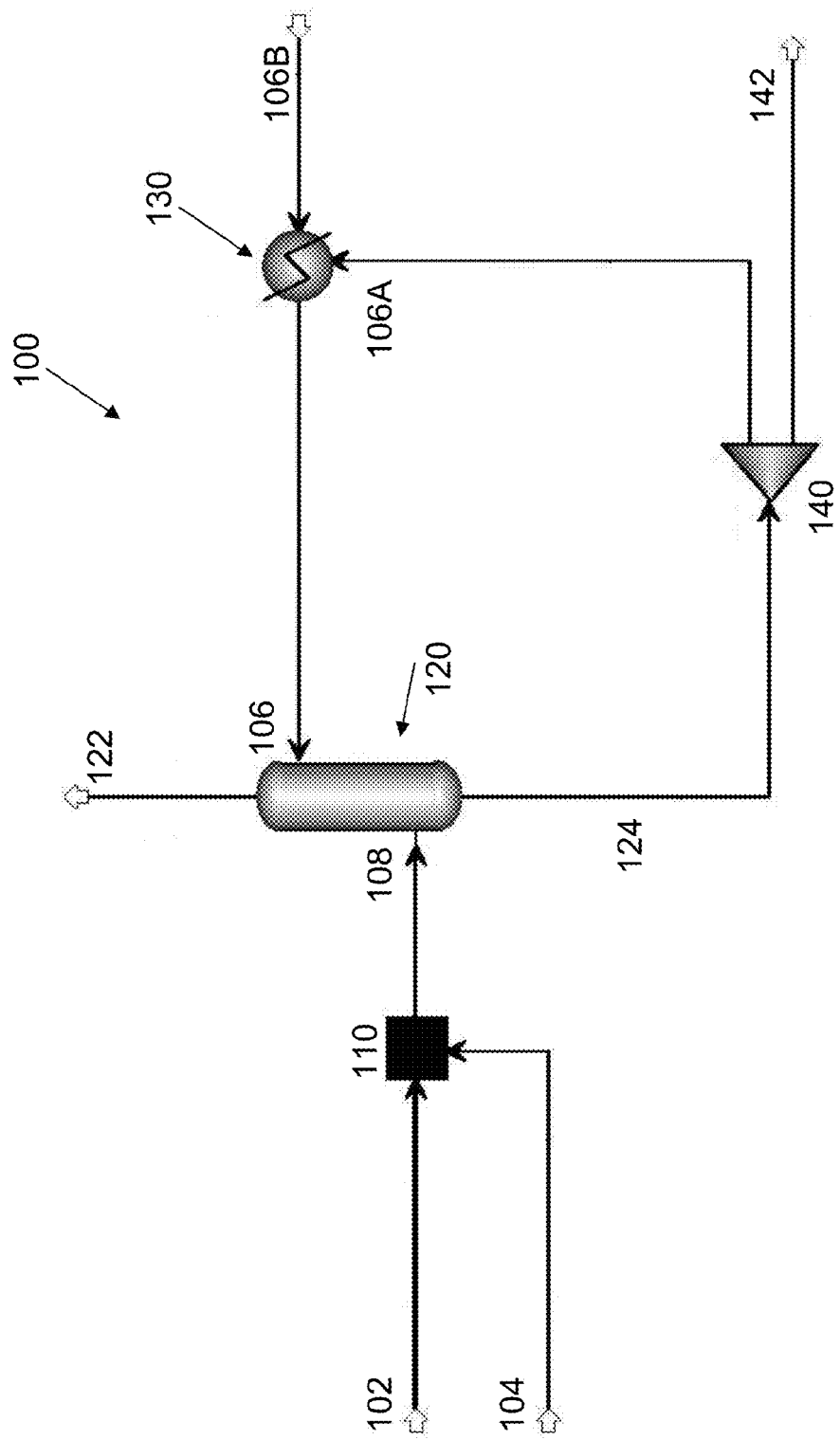
FIG. 1 is a schematic of one embodiment of a system configured to selectively remove an acid gas from a feed stream.

In FIG. 1, system 100 is shown configured to selectively remove an acid gas from a feed stream 102 to reduce co-absorption of $CO_2$. In a preferred embodiment, the acid gas is $H_2S$, although the feed stream could comprise other acid gases including, for example, acetic acid and butyric acid, depending upon the upstream combustion.

System 100 can include an absorber 120 configured to contact at least a portion of the feed stream 102 with a caustic solution 106 such as sodium hydroxide to produce a clean stream 122 that is substantially depleted of the acid gas. Sodium hydroxide, potassium hydroxide and other solvents that are basic and absorb $CO_2$ more strongly than the acid gas could be used for the caustic solution. The absorber 120 can be further configured to receive a driver gas 104 that is substantially non-reactive with the caustic solution 106, such that co-absorption of $CO_2$ by the caustic solution 106 is reduced to less than 10% of the $CO_2$ present in the feed stream 102. It is especially preferred that the addition of the driver gas 104 is sufficient to reduce co-absorption of $CO_2$ by the caustic solution 106 to less than 5%, and more preferably less than 3%, of the $CO_2$ present in the feed stream 102.

Driver gases preferably include inert gases such as He and $N_2$, for example, although $CH_4$, air, and any commercially suitable gas could be used that is substantially non-reactive with the caustic solution. The addition of the driver gas advantageously dilutes the feed gas and reduces the driving force for absorption of $CO_2$ relative to the acid gas. In this manner, the driver gas can increase the absorption kinetics for the acid gas relative to $CO_2$. Thus, the co-absorption of $CO_2$ can be reduced without the need for low residence times.

In some contemplated embodiments, the system 100 can include a mixer 110 that is fluidly coupled upstream of the absorber 120 and configured to allow for mixing of the feed stream 102 and the driver gas 104 to produce a first feed stream 108, at least a portion of which can be fed to absorber 120. Use of mixer 110 upstream of the absorber 120 adds an additional degree of control, which enables the driver gas 104 to be mixed with the feed stream 102 containing the acid gas prior to feeding the feed stream 102 to the absorber 120.

In other contemplated embodiments, the driver gas can be fed as a separate stream to the absorber 120.

At least a portion of the caustic solution 124 can be collected at a bottom portion of the absorber 120 and sent to a separator 140, which separates the caustic solution from the spent caustic fluid 142 and other fluids. The separated caustic solution 106A can then be fed to the absorber to form a recirculating loop. It is contemplated that the recycled caustic solution 106A can be condensed through heat exchange in exchanger 130 before the caustic solution 106 is fed to the absorber 120.

Additional caustic solution 106B can be combined with the recycled solution 106A as needed as a make-up fluid to replace spent caustic fluid. The amount of make-up fluid needed will likely depend upon the overall reduction of co-absorption of $CO_2$.

Figure 2:
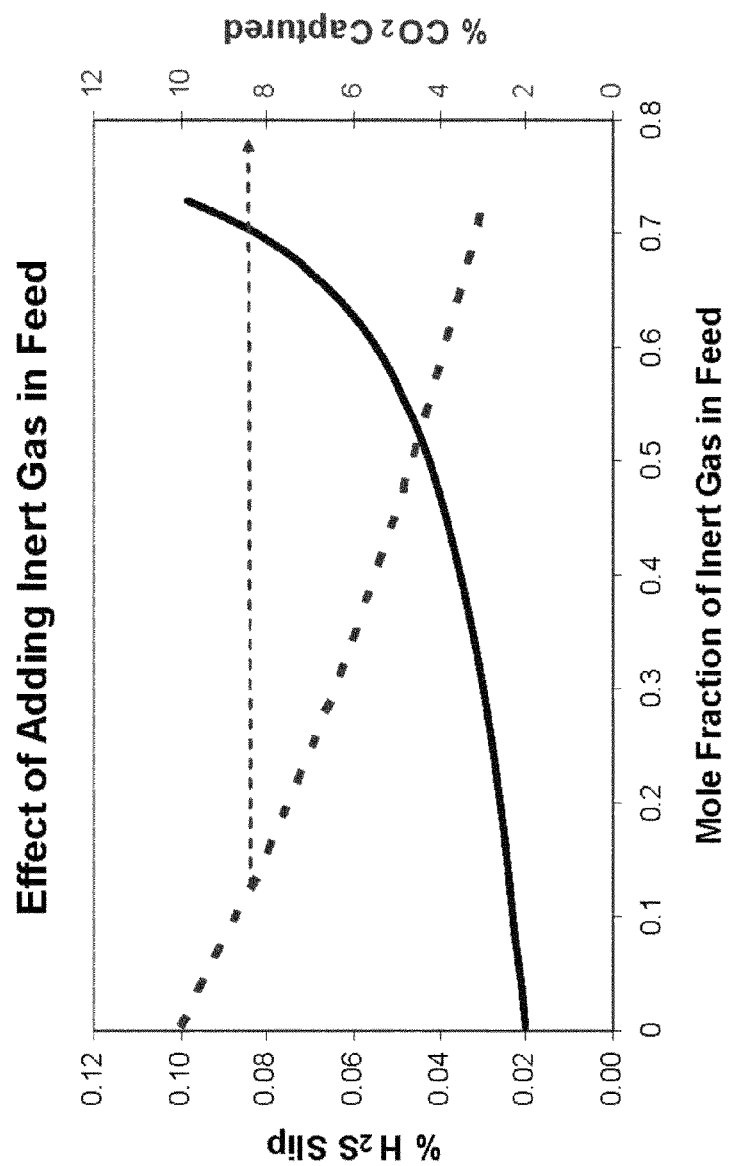
FIG. 2 is a chart of illustrating the effect of adding a driver gas to the feed gas on the amount of $CO_2$ captured.

In FIG. 2, a chart is shown that illustrates an example of the effect of adding a driver gas to the feed gas has on the amount of $CO_2$ captured. In the example depicted in FIG. 2, the driver gas is $N_2$, and the acid gas is $H_2S$.

Without the addition of the driver gas, the $H_2S$ slip is 0.02%, while about 10% of the $CO_2$ is captured. When $N_2$ is added to the feed gas such that its mole fraction is raised to 50%, the fraction of $CO_2$ captured is reduced by a factor of about two (to about 5%), while the $H_2S$ slip is still low (about 0.04%). Thus, as the mole fraction of $N_2$ is increased in the feed gas, the amount of CO2 captured is significantly reduced while maintaining the $H_2S$ slip at low levels.

Figure 3:
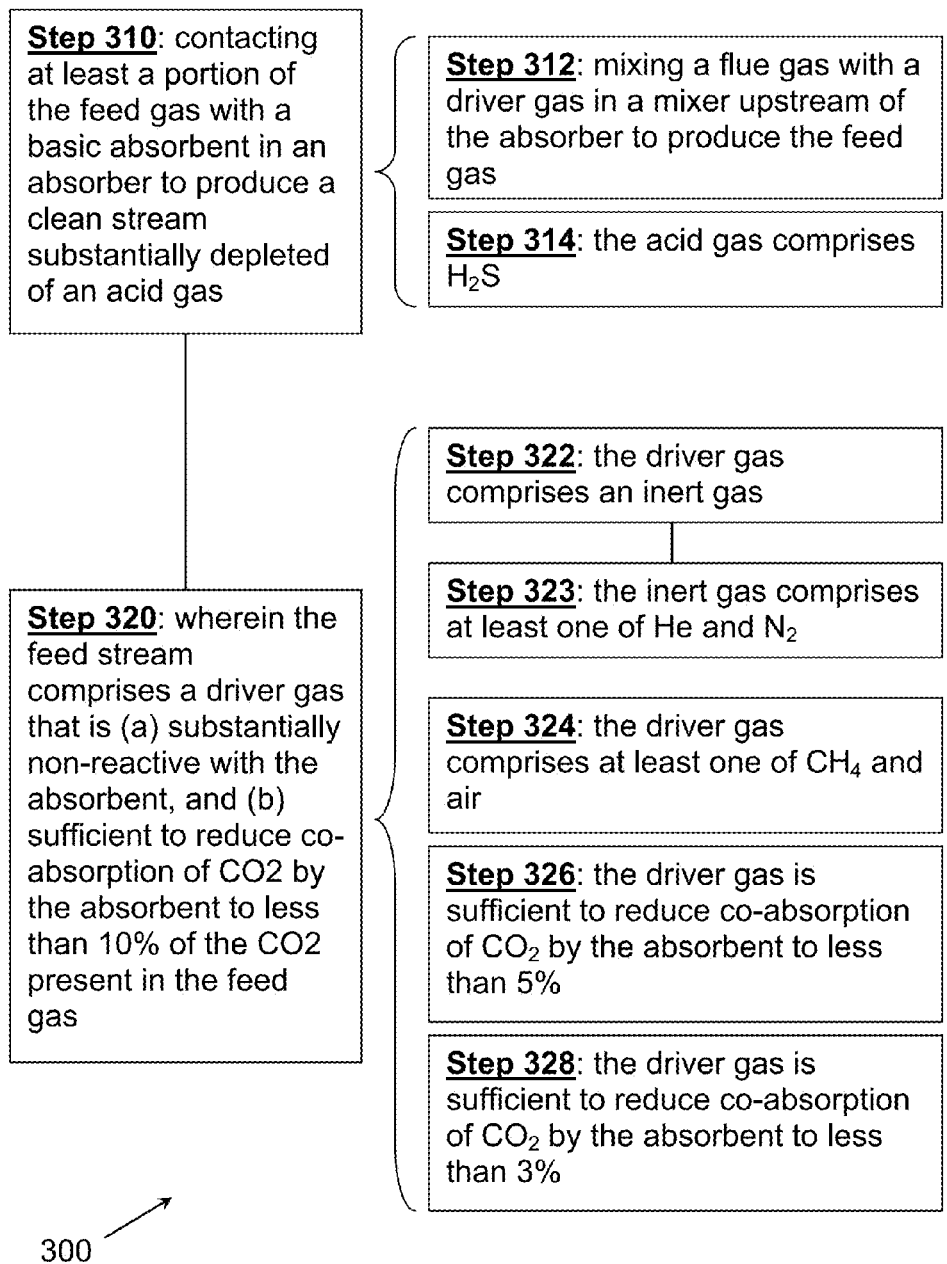
FIG. 3 is a flowchart of one embodiment of a method of reducing co-absorption of $CO_2$ from a feed gas.

FIG. 3 illustrates one embodiment of a method 300 of reducing co-absorption of $CO_2$ from a feed stream.

In step 310, at least a portion of the feed stream can be contacted with a caustic solution or other strong, basic absorbent that absorbs $CO_2$ more strongly than the acid gas in an absorber to produce a clean stream substantially depleted of an acid gas. In step 314, the acid gas comprises $H_2S$, although it is contemplated that the method 300 could be used with other acid gases depending upon the upstream combustion.

The feed stream can preferably include a driver gas in step 320, which is (a) substantially non-reactive with the caustic solution, and (b) sufficient to reduce co-absorption of $CO_2$ by the caustic solution to less than 10% of the $CO_2$ present in the feed stream.

The driver gas preferably is an inert gas in step 322, and more preferably at least one of He and $N_2$ in step 323. However, it is contemplated in step 324 that non-inert gases could be used including, for example, $CH_4$ and air, so long as the chosen driver gas is substantially non-reactive with the caustic solution and sufficient to reduce co-absorption of $CO_2$. The specific gas chosen will likely depend upon the caustic solution and the desired reduction of $CO_2$ co-absorption.

It is especially preferred in step 326 that the driver gas is selected such that co-absorption of $CO_2$ by the caustic solution is reduced to less than 5%, and more preferably, less than 3% in step 328.

In step 312, the feed stream can be mixed with the driver gas in a mixer disposed upstream of the absorber to thereby produce the feed stream. Alternatively, the driver gas can be fed directly to the absorber without pre-mixing the driver gas with the feed stream.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system configured to selectively remove an acid gas from a feed stream to reduce co-absorption of $CO_2$, comprising:
   an absorber configured to contact at least a portion of the feed stream with a basic absorbent to produce a clean stream substantially depleted of the acid gas; and
   wherein the absorber is further configured to receive a driver gas that is substantially non-reactive with the basic absorbent, such that co-absorption of $CO_2$ by the basic absorbent is reduced to less than 10% of the $CO_2$ present in the feed stream.

2. The system of claim 1, further comprising a mixer fluidly coupled upstream of the absorber and configured to allow for mixing of the feed stream and the driver gas.

3. The system of claim 1, wherein the driver gas comprises an inert gas.

4. The system of claim 3, wherein the inert gas comprises at least one of He and $N_2$.

5. The system of claim 1, wherein the driver gas comprises at least one of $CH_4$ and air.

6. The system of claim 1, wherein addition of the driver gas is sufficient to reduce co-absorption of $CO_2$ by the absorbent to less than 5% of the $CO_2$ present in the feed stream.

7. The system of claim 1, wherein addition of the driver gas is sufficient to reduce co-absorption of $CO_2$ by the absorbent to less than 3% of the $CO_2$ present in the feed stream.

8. The system of claim 1, wherein the acid gas comprises $H_2S$.

9. The system of claim 1, wherein the absorbent comprises a caustic solution.

10. A method of reducing co-absorption of $CO_2$ from a feed stream, comprising:

contacting at least a portion of the feed stream with a basic absorbent in an absorber to produce a clean stream substantially depleted of an acid gas; and wherein the feed stream comprises a driver gas that is (a) substantially non-reactive with the basic absorbent, and (b) sufficient to reduce co-absorption of $CO_2$ by the basic absorbent to less than 10% of the $CO_2$ present in the feed stream.

11. The method of claim 10, further comprising the step of mixing a flue gas with the driver gas in a mixer upstream of the absorber to produce the feed stream.

12. The method of claim 10, wherein the driver gas comprises an inert gas.

13. The method of claim 12, wherein the inert gas comprises at least one of He and $N_2$.

14. The method of claim 10, wherein the driver gas comprises at least one of $CH_4$ and air.

15. The method of claim 10, wherein the driver gas is sufficient to reduce co-absorption of $CO_2$ by the absorbent to less than 5%.

16. The method of claim 10, wherein the driver gas is sufficient to reduce co-absorption of $CO_2$ by the absorbent to less than 3%.

17. The method of claim 10, wherein the acid gas comprises $H_2S$.

18. The method of claim 10, wherein the absorbent comprises a caustic solution.

* * * * *